May 6, 1958     F. P. ZIERDEN     2,833,183

TOOL HEAD

Filed April 11, 1955     2 Sheets-Sheet 1

INVENTOR.
FRANK P. ZIERDEN
BY
Miles Henninger
ATTORNEY

INVENTOR.
FRANK P. ZIERDEN
BY
ATTORNEY

United States Patent Office 2,833,183
Patented May 6, 1958

2,833,183
TOOL HEAD
Frank P. Zierden, Milwaukee, Wis.
Application April 11, 1955, Serial No. 500,439
5 Claims. (Cl. 90—54)

This invention relates to improvements in tool heads for machine tools in which the tool or the work is reciprocated for cutting in straight lines and in which cutting is done in only one direction of relative movement of the tool and the work piece.

In machine tools such as metal cutting planers, shapers or slotters, the cutting tool or the work piece is reciprocated so that the tool must assume one position on forward or cutting stroke, and must move to another position on the return or non-cutting stroke to avoid damaging the tool and the cut surface by dragging the tool over the surface on the return stroke. Heretofore, reciprocating metal cutting tools were mounted in means called "clappers" in which the tool holder and the tool were pivoted so that the tool could slide on the cut surface upon return stroke with only the weight of the tool and the clapper bearing on that portion of the tool sliding on the cut surface. The clapper being pivoted only, is limited in its movement and the entire clapper-tool assembly must be reset in a machine for cutting at a different angle relative to or from a different side of, the work piece. Hence, the use of a clapper is time consuming and requires the expenditure of considerable energy by the machine operator. Further, the clapper brings the tool into cutting position by gravity and therefore cannot be used "overhead" or in other positions where gravity tends to move the tool away from the work piece.

It is therefore one object of the present invention to provide a tool head for machine tools operating by reciprocation of the tool or the work piece and in which the tool edge is raised from cutting position on the non-cutting part of the work stroke, regardless of the plane of the cut with respect to the axis through the tool head.

Another object of the present invention is to provide a tool head for machine tools operating by reciprocation of the tool or the work piece and in which the tool can move from cutting position on the return stroke to raise the tool edge off the surface of the work regardless of the action of gravity on the parts in any position relative to a circle having its center on the axis of the tool head.

Another object of the present invention is to provide a tool head for machine tools operating by reciprocation of the tool or the work piece and in which the tool is quickly and easily positioned for cutting in any position at an angle to a horizontal or vertical plane through the axis of the tool head, and is "indexed" to the desired position in a circle about the axis of the tool head.

Another object of the invention is to provide a tool head for machine tools making straight line cuts by reciprocation of the tool or the work piece, to be used in place of the usual clapper mounting for the tools, and of a height approximating that of the usual clapper and free from limitations of the clapper in cutting from different sides and at angles in a circle about the axis of the tool head.

Another object of the invention is to provide a tool head for machine tools for reciprocatory cutting actions in which the tool can be moved in a continuous arc about the axis of the tool head for cutting radii by the use of a single tool.

Advantages and objects other than those above set forth will be apparent from the following description when read in connection with the accompanying drawings in which.

Figure 1:
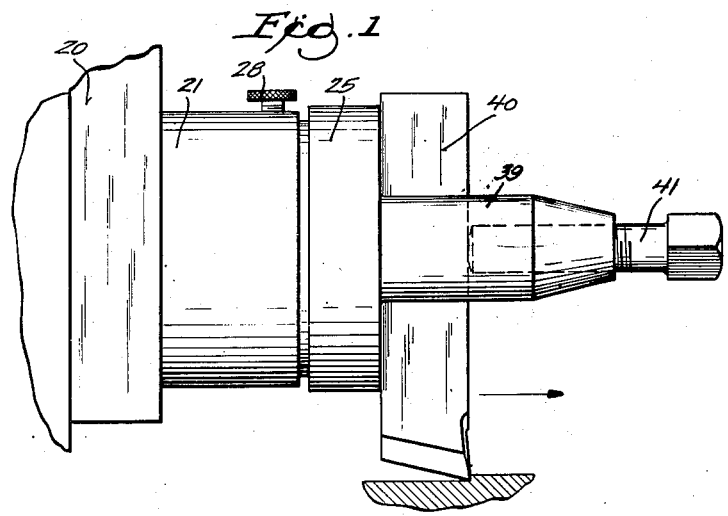
Fig. 1 is a side elevation of a fragment of the slide of a metal cutting machine tool known as a shaper and with the present tool head, a tool post and a tool mounted thereon.

Generally, the present tool head comprises a receiver to be fixed to the usual tool retaining portion of a machine tool such as the slide of a shaper, for making cuts in straight lines by relative reciprocation of the tool and the work piece. The receiver has a socket in which is mounted a holder for a tool post or bar dependent on whether the cut is to be on the exterior or interior of the work piece and a cutting tool. The receiver socket is at least partially frusto-conical, in some embodiments, and the conical surface extends for a major portion of the depth of the socket. The conical surface has interrupted grooves therein which form relatively sharp edged and heavy teeth longitudinally of the conical surface. In another form, the receiver supports a worm extending into a generally conical socket with a plane surface. In another form, the receiver has a conical outer surface on which the teeth are formed and has a cylindrical socket with a plane surface.

A holder for a tool post or bar, has a plug portion shaped to seat in the receiver conical socket or on the receiver conical surface and such plug portion has teeth corresponding to the receiver teeth for interlocking engagement therewith. The tool holder has a threaded socket for retaining the usual tool post or bar and has a second socket connected with the threaded socket for a spring acting between a surface of the tool holder and a screw extending from the second socket for engaging the machine slide. The spring and screw provide means tending to retain the holder in seated position on or in the receiver, but allow shifting of the tool post holder relative to the receiver. The cutting tool is fixed in the tool post or tool bar as usual.

In each embodiment disclosed herein, means are also provided for limiting movement of the holder out of seated position in or on the conical surface of the receiver. Such means may be so placed or operated in such manner as to permit rotation of the holder about the axis of the receiver whereby the tool can be set to cut at various angles in a circle about such axis and from various sides of the work piece. In three modifications, such means are limit position stops, and in another modification, the means may also be operated to index the tool holder to any desired position in a circle having the receiver axis as its center.

Referring to the drawings by numerals in which like numbers designate like parts, 20 is a fragment of the slide of a metal cutting shaper on which the cutting tool is to be mounted and which is reciprocable and by which the tool is fed toward the work piece. A receiver 21 is attached to the end of the shaper slide by a number of screws 22 (three or more) which hold the receiver in fixed position on the slide. The receiver in Figs. 1–3 and 6 has a socket with a conical surface portion and a cylindrical surface portion. The conical surface is grooved in axial direction as is best shown in Fig. 3, the grooves being triangular in cross-section to form triangular teeth. The number of teeth is such that each tooth or group of teeth occupies any desired number of degrees of a circle. Thus, if 45 teeth are used per full rotation of the holder relative to the receiver, the width of one tooth requires a rotation of 8°, but the teeth can obviously be made to subtend any desired angularity for particular work. The grooves "run out" in the cylindrical receiver surface but at least a part of such surface is planar.

Figure 2:
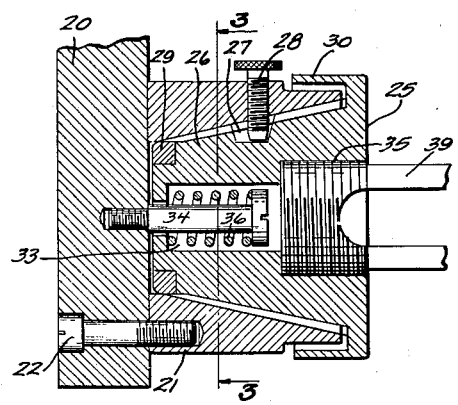
Fig. 2 is a longitudinal cross-section through a portion of the shaper slide and the present tool head and a portion of the tool post.
Figure 3:
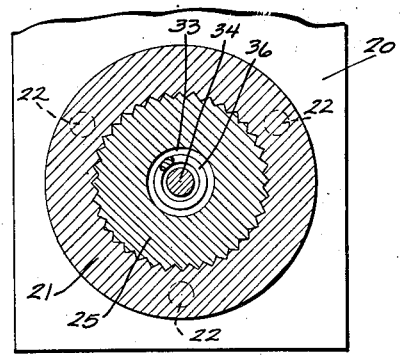
Fig. 3 is a transverse cross-section on the planes of broken line 3—3 of Fig. 2.

In the embodiment shown in Figs. 1, 2 and 3 a portion of the receiver outer surface is recessed for at least partial reception of a part of a tool holder generally designated 25. The holder 25 comprises a plug portion 26 which is conical for its greater length and of a size to seat in the receiver socket conical portion. Teeth are formed on the holder plug of a size and shape to seat in the teeth in the receiver. A groove 27 of considerable width is formed peripherally about the holder plug portion 26 and a screw 28 is threaded through the receiver socket wall to enter the groove 27. The screw 28 does not bear in groove 27 but acts as a limit stop for movement of the holder in the receiver while preventing complete disengagement thereof. A relatively small part of the plug has a cylindrical surface at one end thereof to enter the receiver cylindrical portion and is crowned or rounded for "line" bearing on such receiver surface while allowing rocking of the holder so that its longitudinal axis can assume an angle to the axis of the receiver. If desired, a separate ring 29 may be set into the holder portion to bear on the receiver cylindrical surface, the ring being rounded on the surface bearing on the receiver surface.

The holder 25 has a cap portion 30 which extends over the forward portion of the receiver in spaced relation to and adjacent an edge formed in the outer surface of the receiver. The receiver may have a scale of 360° marked thereon and a mark may be placed on the holder cap portion 30 to serve as a zero marking for the scale. A hole is formed axially through the receiver plug 26 on its longitudinal axis and is enlarged to form communicating sockets of which a first socket 33 is of a size to receive a screw 34 with some clearance. The screw 34 extends from the holder for threading into a hole in the slide and is accessible through a second holder socket 35 for firm seating in the slide. The clearance around the screw 34 is such that the holder may rock relative to the screw. A helical compression spring 36 is seated between the end of the socket and the head on the screw 34.

The second socket 35 in the holder is internally threaded to receive the threaded end of a tool post or bar, Figs. 1–4 showing a tool post 39 of the usual construction which is slotted to receive the usual tool 40 held in the tool post by a screw 41. It will be understood that the usual tool bar and tool may be used in place of the tool post for making cuts internally in a work piece.

Figure 4:
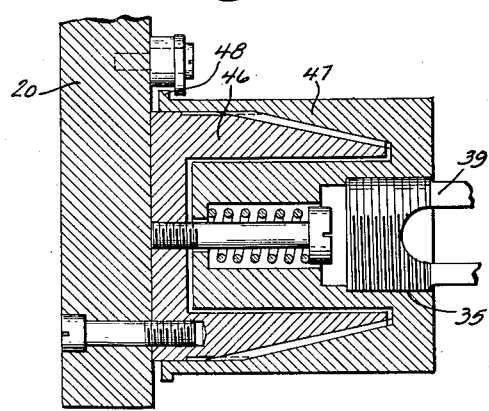
Fig. 4 is a view similar to Fig. 2 of a modified form of tool head.
Figure 5:
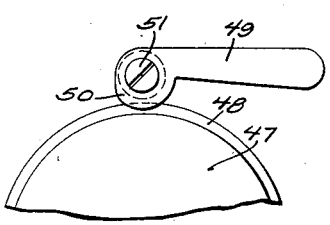
Fig. 5 is a side elevation of a portion of the structure shown in Fig. 4.
Figure 6:
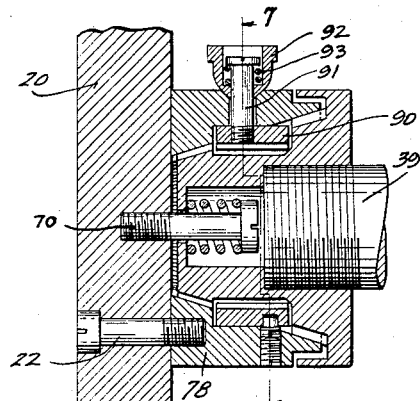
Fig. 6 is a view similar to Fig. 2 of another modification of the tool head and particularly the portion thereof for releasably joining the receiver and the tool post holder.
Figure 7:
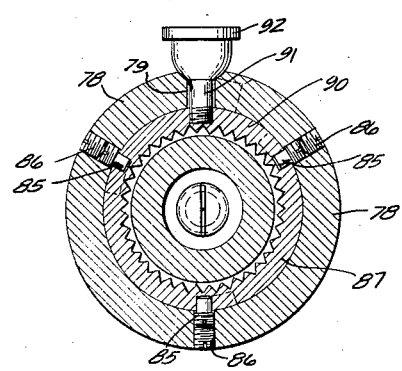
Fig. 7 is a transverse section on the plane of line 7—7 of Fig. 6.
Figure 8:
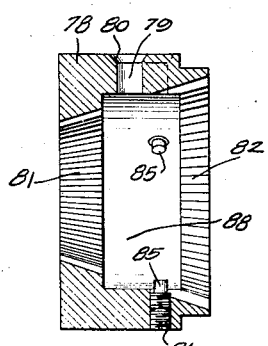
Figs. 8, 9 and 10 are longitudinal sections of the various elements of the structure of Figs. 7 and 8 in spaced position but in their relative locations.
Figure 9:
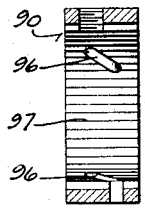
Figure 10:
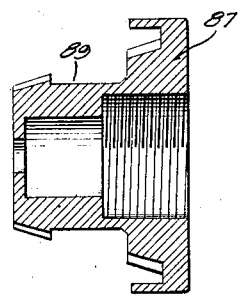
Figure 12:
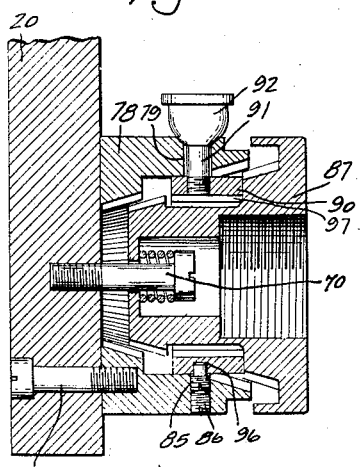
Fig. 12 is a view showing with the parts of Figs. 6–11 in position for removal of the tool holder from the receiver.
Figure 11:
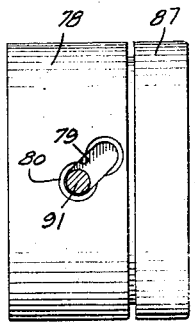
Fig. 11 is a side elevation of the tool head of Figs. 6–10 with a portion of a handle cut away.

In the modification shown in Figs. 4 and 5, the shapes of the receiver and the holder are reversed but the functions and co-actions thereof are, respectively, the same and closely similar to those described above. Receiver 46 now has an outer surface formed in part as a cone and in part as a cylinder. The conical receiver portion is again grooved and the cylindrical portion again provides a guiding and bearing surface for the holder. The receiver socket is now cylindrical and smooth surfaced and has an axial hole therefrom.

The holder now has a cap portion 47 with conical and cylindrical surfaces conforming generally to the outer surfaces of the receiver and both the receiver and holder conical surfaces are again grooved as was previously described. The holder cap has an outwardly extending peripheral flange 48 at the end of the cap adjacent the machine slide 20. A lever comprising a handle 49 and a cam portion 50 is pivoted at 51 on the end of the machine slide. The shape of the cam lever is such as to keep the holder in place on the receiver, within limit positions, when the cam 50 is in the position shown in Figs. 4 and 5. Thus, the holder can rock relative to but cannot be axially withdrawn from the receiver.

Referring now to Figs. 6–12, a receiver 78 is generally of the form shown in Figs. 2 and 3 but is provided with a slot 79 diagonal to the axis of the receiver. The exterior surface of the receiver is chamfered about the ends of the slot as indicated at 80. The internal conical surfaces of the receiver are formed with teeth 81, 82 as previously described. The receiver has a number of screws extending into the socket therein, each screw preferably being in two parts 85, 86 with the outer screw locking the inner screw in place. The receiver 78 and a holder 87 now cooperate in defining an annular space of which the receiver and holder parts are respectively designated 88 and 89. A ring 90 occupies a part of the space 88, 89 and has a pin 91 extending through the receiver slot 79, the pin having a movable handle 92 under action of a spring 93. Movement of the pin in the slot tends to move the ring from side to side in the space for retaining the holder in the receiver while allowing rocking of the holder, or for releasing the holder for complete removal from the receiver.

The ring 90 has a number of diagonal slots 96 for severally receiving the ends of the several screws 85, 86 and the ring has internal teeth 97. Hence, the ring is both guided and movable axially of the receiver by movement of the pin and its handle 91–93 and of the screw pins 85, 86 in their respective slots, when the handle is lifted out of one of its chamfer seats 80 and pressed to the other end of the slot.

In operation of the present modification, the ring pin 91 is shifted to the left hand end of its slot 79, 80 which also brings the pins 85, 86 to the left hand end of their respective slots 96, when cutting is to take place. The ring 90 is then in the position shown in Fig. 6 and is spaced at both of its edges from the corresponding sides of the space 88, 89 in the receiver and holder. During the cutting stroke, the holder conical surface seats on the receiver conical surface with their respective teeth in mesh. Upon return stroke, the holder pulls away from its seat until the ends of the rear holder teeth come against the edge of the ring which stops movement of the holder outwardly from the socket. The receiver and holder teeth are still in mesh but the holder can now rock relative to the receiver for sliding of the tool on the work surface during the return stroke.

When one cut is finished and it is desired to continue cutting at an angle to the first cut, the screw or the ring in the first and fourth embodiments are released and the holder-tool assembly is pulled forward along its axis sufficiently to disengage the holder teeth from the receiver teeth, which compresses the spring slightly. The entire sub-assembly may then be rotated to the desired position as shown on the scale. The holder is then released and is retracted into the receiver by the spring to re-engage the two sets of teeth completely, and cutting is begun. In the second modification there is not sufficient clearance between the holder flange 48 and the lever cam 50 for disengaging the holder teeth from the receiver teeth without movement of the cam. Hence, the cam is first rotated to move the cam surface above the edge of flange 48 so that holder 47 can be pulled forward for re-setting.

In use of all of the embodiments shown, the holder conical surface seats in or on the receiver conical surface and the holder teeth mesh with the receiver teeth upon forward cutting stroke of the tool. On the return or non-cutting stroke, the friction of the tool (or a supplementary tool-like member) on the work piece surfaces draws the holder out of seated position in the receiver to the extent permitted by the stop screw, the cam, or the ring. When carbide tipped tools are used which should not be dragged backward on the work piece surface, other means such as a piece of ordinary steel may be placed adjacent the tool and shaped to provide a bearing surface for the return stroke of the tool. The tool, tool post and holder then rock or tilt in or about the cylindrical receiver and holder surfaces so that the tool bears on the work only to the extent necessary to support its weight and the resistance of the spring to bending and compression during rocking of the holder in the receiver. When the end of the work piece is reached, the tool slides off such piece and the spring again re-engages the holder teeth with the receiver teeth. As soon as the forward stroke of the machine slide engages the tool with the work, the holder conical surface is again seated in the receiver conical surface and the cutting action begins.

When the holder is to be removed for any purpose, removal of the screw 28, turning of the cam 50 or shifting of the ring 90 frees the sub-assembly for such removal, in the first, second and third embodiments. The spring post 34 or 70 is then removed and the holder can then be drawn completely out of the receiver.

In use over a considerable period, the present tool has proved itself capable in performing all types of cutting actions at any angle about its longitudinal axis. The tool head is especially useful in such operations as cutting radii internally in T-slots to eliminate sharp corners therein which are so easily deformed as to make frequent "dressings" of the T-slots necessary. The present construction is adapted to hold any tool where relative reciprocating motion between the tool and the work is required for cutting and where the tool is to slide on the surface of the work piece with relatively little pressure during the return or non-cutting stroke, and is adaptable to planers, shapers and slotters.

I claim:

1. In a tool head for machine tools cutting upon relative reciprocation of a tool and a workpiece and in one direction only, a receiver rigidly attachable to the machine at the location for mounting of a tool on the machine, a receiver having a conical socket, a holder having a socket for a tool and a tool having a conical external surface the internal conical surface of the receiver socket having elongated teeth extending generally axially of the conical socket and projecting radially inwardly therefrom and the external conical surface of the holder having elongated teeth extending generally axially thereof and projecting radially outwardly therefrom for meshing engagement with the teeth of said socket so that the roots of the tooth spaces extend in the general direction of movement of the conical surfaces of the holder into the conical socket of the receiver, means urging the holder teeth into seated position relative to the receiver teeth upon movement of the tool in one direction and releasing the holder teeth from seating position upon movement of the tool in the opposite direction for tilting of the holder in the receiver socket, and means for limiting movement of the holder teeth out of seated position and for limiting tilting of the holder in the receiver socket during movement of the tool in the said opposite direction.

2. In a tool head for machine tools cutting upon relative reciprocation of a tool and a workpiece and in one direction only, a receiver rigidly attachable to the machine at the location for mounting of a tool on the machine, the receiver having a conical socket with interrupted teeth around the periphery thereof, a holder having a socket for a tool post and tool and having a conical external surface with teeth around the periphery thereof for seating in the receiver teeth, the teeth of the holder and of the receiver defining a ring-like space, means for urging the holder teeth into seated position relative to the receiver teeth upon movement of the tool in one direction and releasing the holder teeth from the seated position upon movement of the tool in the opposite direction for tilting of the holder within the receiver socket, a ring engageable with a surface defining the ring-like space for limiting movement of the holder teeth out of seated position and limiting tilting of the holder in the receiver socket, and means extending through the receiver wall and engaging with the ring for shifting the ring axially in the holder socket for limiting tilting movement of the holder in one position and rotation of the holder relative to the receiver in another position.

3. In a tool head for machine tools cutting upon relative reciprocation of a tool and a workpiece and in one direction only, a receiver rigidly attachable to the machine at the location for mounting of a tool on the machine, the receiver having a conical socket with teeth around the periphery thereof, the receiver having a slot through the socket wall at an angle to the plane of reciprocation of the tool, a holder having a socket for a tool post and tool and having a conical external surface with teeth around the periphery thereof for seating in the receiver teeth, the teeth of the holder and of the receiver defining a ring-like space, means for urging the holder teeth into seating on the receiver teeth upon movement of the tool in one direction and releasing the holder teeth from their seated position upon movement of the tool in the opposite direction for tilting of the holder within the receiver socket, a ring engageable with a surface defining the ring-like space for limiting movement of the holder teeth out of seated position and limiting tilting of the holder in the receiver socket, and a pin extending through the receiver slot and engaging with the ring for shifting the ring axially in the holder socket whereby the holder may tilt upon movement of the tool in one direction and may be rotated for placing the tool in another position.

4. In a tool head for machine tools cutting upon relative reciprocation of a tool and a workpiece in one direction, a receiver rigidly attachable to the machine at the location for mounting of a tool on the machine, the receiver having a conical socket with interrupted teeth around the periphery and having a slot through the socket wall at an angle to the line of reciprocation of the tool and having seats formed at the ends of the slot in the external surface of the receiver, a holder having a socket for a tool post and tool and having a conical external surface with interrupted teeth around the periphery thereof for seating in the receiver teeth, the interrupted portion of the teeth of the holder and the receiver defining a ring-like space, means urging the holder teeth into seated position on the receiver teeth upon movement of the tool in one direction and releasing the holder teeth from the seated position upon movement of the tool in the opposite direction for tilting of the holder within the receiver socket, a ring engageable with a surface defining the ring-like space for limiting movement of the holder teeth out of seated position and limiting tilting of the holder in the receiver socket, a pin extending through the receiver slot and engageable with the ring for shifting the ring axially in the holder socket, and a handle on the pin for engagement in the seats of the slot to hold the ring in either of two positions.

5. In a tool head for machine tools cutting upon relative reciprocation of a tool and a workpiece and in one direction only, a receiver rigidly attachable to the machine at the location for mounting of a tool on the machine, the receiver having a conical socket with interrupted teeth around the periphery thereof in radial planes through the axis of the socket, a holder having a socket for a tool post and tool and having a conical external surface with interrupted teeth around the periphery thereof for seating in the receiver teeth, the interrupted portion of the teeth of the holder and the receiver defining a ring-like space, means urging the holder teeth into seated position on the receiver teeth upon movement of the tool in one direction and releasing the holder teeth from the seated position upon movement of the tool in the opposite direction for tilting of the holder within and relative to the axis of the receiver socket, a ring engageable with a surface defining the ring-like space for limiting movement of the holder teeth out of seated position and limiting tilting of the holder in the receiver socket, the ring having grooves in the outer periphery thereof at an angle in the directions of tool movement, means extending through the receiver wall for shifting the ring axially of the holder socket, and pins extending into the receiver socket for engaging the holder grooves to guide the ring in its movement axially of the holder socket.

References Cited in the file of this patent

UNITED STATES PATENTS

| | | |
|---|---|---|
| 1,112,869 | Tirrell | Oct. 6, 1914 |
| 2,645,000 | Finch | July 14, 1953 |

FOREIGN PATENTS

| | | |
|---|---|---|
| 263,169 | Germany | Aug. 2, 1913 |
| 642,314 | Germany | Mar. 2, 1937 |